(12) United States Patent
Findlater et al.

(10) Patent No.: US 7,227,869 B2
(45) Date of Patent: *Jun. 5, 2007

(54) SERIAL MEDIA INDEPENDENT INTERFACE

(75) Inventors: Stewart Findlater, Mountain View, CA (US); Andreas V. Bechtolsheim, Stanford, CA (US)

(73) Assignee: Cisco Technology, Inc., San Jose, CA (US)

( * ) Notice: Subject to any disclaimer, the term of this patent is extended or adjusted under 35 U.S.C. 154(b) by 766 days.

This patent is subject to a terminal disclaimer.

(21) Appl. No.: 10/103,598

(22) Filed: Mar. 20, 2002

(65) Prior Publication Data

US 2002/0126684 A1 Sep. 12, 2002

Related U.S. Application Data

(63) Continuation of application No. 09/088,956, filed on Jun. 2, 1998.

(51) Int. Cl.
*H04L 12/28* (2006.01)
(52) U.S. Cl. .................. 370/419; 370/463; 710/63
(58) Field of Classification Search ..................... None
See application file for complete search history.

(56) References Cited

U.S. PATENT DOCUMENTS

| | | | |
|---|---|---|---|
| 4,748,621 A | | 5/1988 | Ballance et al. |
| 5,099,473 A | | 3/1992 | Gupta et al. |
| 5,243,350 A | | 9/1993 | Vasile et al. |
| 5,469,434 A | * | 11/1995 | Kurdzo et al. ............... 370/364 |
| 5,568,470 A | | 10/1996 | Ben-Nun et al. |
| 5,636,140 A | | 6/1997 | Lee et al. |
| 5,715,287 A | | 2/1998 | Wadhawan et al. |
| 5,754,540 A | | 5/1998 | Liu et al. |
| 5,790,786 A | | 8/1998 | Wakeman et al. |

(Continued)

OTHER PUBLICATIONS

Internal Cisco documentation re: sold Ethernet switch, entitled, "CHAINSAW PCB: Internal Design Specification", Jan. and Jul. 1996.

(Continued)

*Primary Examiner*—Doris H. To
*Assistant Examiner*—Thien D. Tran
(74) *Attorney, Agent, or Firm*—Beyer Weaver LLP

(57) ABSTRACT

Provided is a 10/100Base-T MAC to PHY interface requiring only two wires (pins) per port, with two additional global wires: a clock wire (pin), and a synchronization wire (pin). This reduction in the number of pins associated with each port is achieved by time-division multiplexing wherein each time-division multiplexed wire combines a plurality of definitions from the conventional 100Base-T interface specified by IEEE 802.3u (clause 22). As a result, each port has its own pair of associated time-division multiplexed wires (pins) and the addition of each port simply requires two additional wires. According to a preferred embodiment of the present invention, information normally transferred on sixteen wires in a conventional 100Base-T interface at 25 MHz is time-division multiplexed onto two wires (corresponding to two pins) that transfer data at 125 MHz, five times the speed of conventional interfaces. Importantly, this multiplexing is done on a port by port basis. Therefore, the number of pins required for a MAC to transceiver interface is two times the number of ports plus two instead of sixteen times the number of ports, and the addition of each additional port requires only two more wires (pins).

41 Claims, 7 Drawing Sheets

U.S. PATENT DOCUMENTS

| | | | |
|---|---|---|---|
| 5,835,728 A | 11/1998 | Shinomiya et al. | |
| 5,856,979 A | 1/1999 | Vogel et al. | |
| 5,920,698 A | 7/1999 | Ben-Michael et al. | |
| 4,761,800 A | 8/1999 | Lese et al. | |
| 5,943,341 A | 8/1999 | Gazda, Jr. | |
| 5,953,345 A | 9/1999 | Findlater et al. | |
| 5,987,023 A | 11/1999 | Albrow et al. | |
| 5,995,514 A | 11/1999 | Lo | |
| 6,044,087 A | 3/2000 | Muller et al. | |
| 6,067,585 A | 5/2000 | Hoang | |
| 6,069,878 A | 5/2000 | Christensen | |
| 6,108,726 A * | 8/2000 | Runaldue et al. | 710/62 |
| 6,169,742 B1 | 1/2001 | Chow et al. | |
| 6,269,104 B1 * | 7/2001 | McLaughlin et al. | 370/464 |
| 6,385,208 B1 | 5/2002 | Findlater et al. | |
| 6,400,715 B1 | 6/2002 | Beaudoin et al. | |
| 6,631,138 B1 | 10/2003 | Findlater et al. | |
| 7,031,333 B1 | 4/2006 | Findlater et al. | |
| 2002/0042838 A1 * | 4/2002 | Tabayoyon et al. | 709/237 |

OTHER PUBLICATIONS

Advanced Micro Devices, "Quad Ethernet Switching Transceiver (QuEST™)", Am79C989, Publication No. 21173, Apr. 1997.

Texas Instruments, "Eight 10Base-T Physical-Layer Interfaces", TNETE2008, Dec. 1997, Revised Feb. 1998.

RMII Consortium, "RMII Specification," (Mar. 20, 1998).

U.S. Office Action mailed Feb. 3, 1999, from U.S. Appl. No. 09/089,033. [CISCP032].

U.S. Office Action mailed Apr. 24, 2003, from U.S. Appl. No. 09/339,637. [CISCP032C1].

U.S. Office Action mailed Nov. 6, 2002, from U.S. Appl. No. 09/089,312. [CISCP035].

U.S. Office Action mailed May 5, 2003, from U.S. Appl. No. 09/089,312. [CISCP035].

U.S. Office Action mailed Oct. 28, 2003, from U.S. Appl. No. 09/089,312. [CISCP035].

U.S. Office Action mailed Apr. 2, 2004, from U.S. Appl. No. 09/089,312. [CISCP035].

U.S. Office Action mailed Nov. 10, 2004, from U.S. Appl. No. 09/089,312. [CISCP035].

U.S. Office Action mailed Dec. 20, 2000, from U.S. Appl. No. 09/089,312. [CISCP035].

U.S. Office Action mailed May 23, 2001, from U.S. Appl. No. 09/089,312. [CISCP035].

U.S. Office Action mailed Nov. 6, 2001, from U.S. Appl. No. 09/089,312. [CISCP035].

U.S. Office Action mailed Jun. 18, 2002, from U.S. Appl. No. 09/089,312. [CISCP035].

U.S. Office Action mailed Oct. 25, 2000, from U.S. Appl. No. 09/088,956. [CISCP053].

U.S. Office Action mailed Apr. 10, 2001, from U.S. Appl. No. 09/088,956 [CISCP053].

U.S. Office Action mailed Sep. 13, 2001, from U.S. Appl. No. 09/088,956 [CISCP053].

* cited by examiner

US 7,227,869 B2

SERIAL MEDIA INDEPENDENT INTERFACE

CROSS-REFERENCE TO RELATED APPLICATIONS

This is a Continuation application of co-pending prior application Ser. No. 09/088,956 filed on Jun. 2, 1998.

This application is related to co-pending U.S. patent application Ser. Nos. 09/089,033 and 09/089,312 filed concurrently herewith, which are incorporated herein by reference for all purposes.

BACKGROUND OF THE INVENTION

The present invention relates generally to network computing. More specifically, the present invention relates to methods and apparatuses for connecting a system chip to a 10/100Base-T transceiver, and in particular, to a reduced pin-count serial media independent interface.

In computer network systems there is typically a natural division between chips handling the physical layer, which is responsible for transmitting data on the network, and the system chips, which perform logical operations with data transmitted on the network. Ethernet hubs, routers and switches are composed of multiple ports, and may be generically referred to as multi-port Ethernet devices. Each port is typically composed of a system chip, which includes a media access controller ("MAC") layer, and a physical layer or "PHY." Modern multi-port Ethernet devices typically integrate multiple MACs into one system chip (MAC chip) as well as multiple PHYs into another chip (PHY chip). An interface is required on each chip to transfer signals between the MACs and the PHYs.

IEEE standard 802.3u defines a media independent interface between a MAC layer and a PHY that includes 16 pins used for data and control. As noted above, in devices that include multiple ports that each have a MAC and a PHY, it is common to implement multiple MACs on one chip and multiple PHYs on another chip. If the standard MII, which includes 16 pins for data and control, is used for each MAC and PHY on the MAC chip and the PHY chip, the number of pins required for each chip becomes very large as multiple MACs and PHYs are included on single chips.

For example, typical switches available today may offer 24 ports in a single device. If all of the MACs were to be implemented on one chip and all of the PHYs were to be implemented on another chip then 384 pins would be required just to provide the interface between the MACs and the PHYs of the two chips. Obviously this is impractical. Thus, the requirement of 16 pins for data and control in the standard MII specification adds to the expense of MAC and PHY interfaces both by increasing the number of pins required on chips and by reducing the number of MACs and PHYs which may be combined on a single chip.

FIG. 1A is a block diagram illustrating a standard MAC to PHY interface. A MAC 100 is connected to a PHY 102 via a 16 wire MII. PHY 102 is connected to a physical medium that transmits data over a network 104. MAC 100 is connected to a network device 106 in a device that is using the MAC and the PHY to communicate. The device may be a switch, a repeater, a hub or any other network device that includes ports for communication using the Ethernet 802.3u standard.

FIG. 1B is a block diagram illustrating the problem caused by the number of pins required in the standard MII MAC to PHY interface. A MAC chip 110 includes four MACs 112a, 112b, 112c, and 112d. Each of the four MACs must have 16 pins on the outside of the chip so that it can communicate with a PHY according to the MII standard. Similarly, a PHY chip 120 includes four PHYs 122a, 122b, 122c, 122d. Each of the PHYs must have 16 pins on the outside of the PHY chip so that it may communicate with the MAC via a standard 16 pin MII. Each PHY chip is also connected to a physical medium that is used to communicate over a network 130.

It would be extremely useful if an alternative standard to the MII standard could be developed which would allow for communication between a MAC and a PHY using a reduced number of lines between the MAC and the PHY. This would reduce the number of pins per MAC or PHY included on a chip, reduce the cost of the chip, and allow more MACs or PHYs to be included on a single chip. An alternative interface to the MII should include all of the control signals and the same data capacity as the MII so that such an interface could continue to be interoperable with all systems that are intended to operate with an MII as described in IEEE standard 802.3u.

FIG. 2 is a block diagram illustrating the functions of the sixteen lines specified in the MII standard. A MAC 200 is connected to a PHY 202 using the 16 wire MII standard interface. The interface includes a transmit clock line 210 that provides a clock signal for clocking the transmitted data. A transmit enable line 212 indicates when data is being transmitted on the transmit data lines. A transmit error line 214 indicates an error should be forced onto the network. This line is used, for example, by repeaters to propagate errors that have been detected. A set of four lines 215 are used to transmit data. Since the overall data transfer rate between the MAC and the PHY is 100 MHz in a 100 Base-T system, each of the four data wires transmits at 25 MHz.

The MII also includes a carrier sense line 215 which indicates that data is being either received or transmitted. In addition, a collision line 220 is included which indicates that a collision has been detected, i.e., data is being both received and transmitted simultaneously. A receive clock line 222 is used to provide a clock for clocking the received data. A set of four receive data lines 224 each transfer data at 25 Mhz for an overall data rate of 100 MHz. A receive data valid line 226 indicates that valid data is being transferred on the receive data lines. A receive error line 228 indicates when an error has been detected in the received data, such as when an illegal symbol is detected by the PHY.

An MII is commonly used with a 100Base-TX PHY, for example, where data is transmitted across the physical medium of the network from PHY to PHY at a data rate of 125 MHz. Bits of data are grouped into individual symbols which include five bits each. The PHY receives each five bit symbol and translates it into a four bit nibble of data. Thus, the five bit symbol is used to transmit only four bits of data, with the remaining possible information states of the symbol used for error detection or other purposes. When errors are detected by the PHY, they are propagated to the MAC using the receive error line. Certain devices, such as repeaters, may use the transmit error line to propagate errors to other devices on a network. It should be noted that the receive data valid line differs from the carrier sense line in that the receive data valid line does not go high as soon as data begins to be received. Instead, the receive data valid line goes high after an entire five bit symbol corresponding to a nibble of valid data has been received and decoded, and remains high after data has stopped being received between PHYs to allow decoding of all four bits of the nibble corresponding to the last symbol transmitted. MIIs may also be used to connect a MAC to a PHY which uses another data transfer format, such as a 100Base-T4 PHY.

One approach to reducing the number of pins required for the MAC to PHY interface has been proposed by the Reduced Media Independent Interface™ (RMII™) consortium. The RMII provides a six pin interface between a MAC and a PHY. In addition to the six wires required for each MAC to PHY interface, a single synchronous clock signal is provided for both transmit data sent from the MAC to the PHY and the receive data sent from the PHY to the MAC. In the six pin RMII, two pins are used to transmit data and two pins are used to receive data. Each of the data transmit and the data receive lines runs at 50 Mhz. This provides a total bandwidth of 100 MHz for sending and a 100 MHz for receiving data across the MAC to PHY interface.

Thus, the RMII reduces the number of pins required to transmit and receive data from eight to four by doubling the clock speed of the data lines. The RMII reduces the eight pins required to send the remaining six control signals to only two pins by combining certain control signals and deriving other control signals in the manner described below. The transmit clock and the receive clock lines are eliminated for each individual MAC to PHY interface because a single synchronous clock is used for all of the interfaces on a single chip. The remaining six control signals are combined and derived from only two control lines as is described below.

The carrier sense and receive data valid control signals are combined on a single line by the RMII. As described above, the carrier sense signal differs from the receive data valid single in that the carrier sense signal goes high as soon as the PHY begins to receive data. The receive data valid signal goes high only after the PHY has received the first complete symbol of data and decoded the first nibble of data. Also, the receive data valid symbol remains high until the last nibble corresponding to the last symbol has been transferred to the MAC. The RMII combines the two signals into one on a single line as follows: the combined signal asserts with carrier sense and remains asserted while both carrier sense and receive data valid are both asserted. The signal alternates between the asserted and deasserted state while carrier sense is not asserted, but receive data valid is still asserted, so that carrier sense and received data valid are time-division multiplexed. The signal becomes deasserted while both carrier sense and receive data valid are deasserted.

On the second and last control line provided by the RMII, a transmit enable signal is provided. The collision signal is derived from the transmit enable signal and the carrier sense portion of the carrier sense data valid signal. When both are asserted, the RMII determines that a collision has occurred. The last two control signals, the receive error signal and the transmit error signal are transferred across the interface by altering the data sent when an error is detected. When an illegal symbol is detected, the rest of the data is filled with a specific data pattern such as alternating ones and zeros. When the specific data pattern is read, then it is determined that an error has occurred. There is a finite probability that good data may match the specific data pattern causing the MACs to determine that an error has occurred when, in fact, no error has occurred. However, the RMII is designed so that the probability of such mistakes occurring is acceptably small to the system designers.

It should also be noted that the IEEE MII specification requires backward compatibility with a 10base-T Ethernet interface so that data may be transferred between the MAC and the PHY at either 100 MHz or 10 MHz. When data is transmitted at 10 MHz, then each bit is repeated ten times so that the 10 MHz data may be recovered by sampling every tenth bit. It is necessary, therefore, to indicate to the MAC or the PHY whether data is being transmitted at 100 MHz or 10 MHz so that proper sampling of the data may be implemented. The RMII accomplishes determining the correct data rate by using an out-of-band communication between the MAC and the PHY. The MAC queries a designated PHY register using the MII management bus to determine the selected data rate. It would be useful if an alternative to this out-of-band communication could be developed since the out-of-band communication is slow and there is a possibility that the out-of-band communication may not be accomplished before data is transmitted.

Accordingly, it would be useful if the number of wires interfacing a 10/100Base-T MAC and PHY could be even further reduced to less than six wires. Furthermore, it would be useful if an in-band data rate communication between the MAC and the PHY could be developed.

SUMMARY OF THE INVENTION

The present invention addresses this problem by providing a 10/100Base-T MAC to PHY interface requiring only two wires (pins) per port, with two additional global wires: a clock wire (pin), and a synchronization wire (pin). This reduction in the number of pins associated with each port is achieved by time-division multiplexing wherein each time-division multiplexed wire combines a plurality of definitions from the conventional 100Base-T interface specified by IEEE 802.3u (clause 22). As a result, each port has its own pair of associated time-division multiplexed wires (pins) and the addition of each port simply requires two additional wires. According to a preferred embodiment of the present invention, information normally transferred on sixteen wires in a conventional 100Base-T interface at 25 MHz is time-division multiplexed onto two wires (corresponding to two pins) that transfer data at 125 MHz, five times the speed of conventional interfaces. Importantly, this multiplexing is done on a port by port basis. Therefore, the number of pins required for a MAC to transceiver interface is two times the number of ports plus two instead of sixteen times the number of ports, and the addition of each additional port requires only two more wires (pins). Moreover, the present invention provides for in-band data rate determination.

In one aspect, the present invention provides a multi-port 10/100Base-T Ethernet device. The device includes a MAC chip, a PHY chip, and an interface connecting the MAC and PHY chips. The interface includes two time-division multiplexed wires per port, each time-division multiplexed wire conveying time-division multiplexed signals having different definitions, and two global wires conveying clock and synchronization pulse signals for up to all of the ports.

In another aspect, the present invention provides a 10/100Base-T MAC to PHY interface. The interface includes two time-division multiplexed wires for each port serviced by the interface, each time-division multiplexed wire conveying time-division multiplexed signals having different definitions, and two global wires conveying clock and synchronization pulse signals for one or more ports.

In a further aspect, the present invention provides a method of interfacing a MAC to a PHY in a 10/100Base-T Ethernet device. The method involves conveying a first plurality of time-division multiplexed signals having different definitions from a MAC to a PHY over a transmit wire, and a second plurality of time-division multiplexed signals having different definitions from the PHY to the MAC over a receive wire. In addition, the method involves conveying a clock signal to the MAC and PHY over a global clock wire, and a synchronization pulse signal to the MAC and PHY over a global synchronization pulse wire.

In still a further aspect, the present invention provides a method of interfacing a plurality of MACs in a 10/100Base-T Ethernet device. The method involves conveying a first plurality of time-division multiplexed signals having different definitions from a first MAC to a second MAC over one wire, and a second plurality of time-division multiplexed signals having different definitions from the second MAC to the first MAC over another wire. In addition, the method involves conveying a clock signal to the MACs over a global clock wire, and a synchronization pulse signal to the MACs over a global synchronization pulse wire.

It should be appreciated that the present invention can be implemented in numerous ways, including as a device, a process, or a system. Some inventive embodiments of the present invention are described below.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides a 10/100Base-T MAC to PHY interface requiring only two wires (pins) per port, with two additional global wires: a clock wire (pin), and a synchronization wire (pin). This reduction in the number of pins associated with each port is achieved by time-division multiplexing wherein each time-division multiplexed wire combines a plurality of definitions from the conventional 100Base-T interface specified by IEEE 802.3u (clause 22). As a result, each port has its own pair of associated time-division multiplexed wires (pins) and the addition of each port simply requires two additional wires. According to a preferred embodiment of the present invention, information normally transferred on sixteen wires in a conventional 100Base-T interface at 25 MHz is time-division multiplexed onto two wires (corresponding to two pins) that transfer data at 125 MHz, five times the speed of conventional interfaces. Importantly, this multiplexing is done on a port by port basis. Therefore, the number of pins required for a MAC to transceiver interface is two times the number of ports plus two instead of sixteen times the number of ports, and the addition of each additional port requires only two more wires (pins).

Figure 1A:
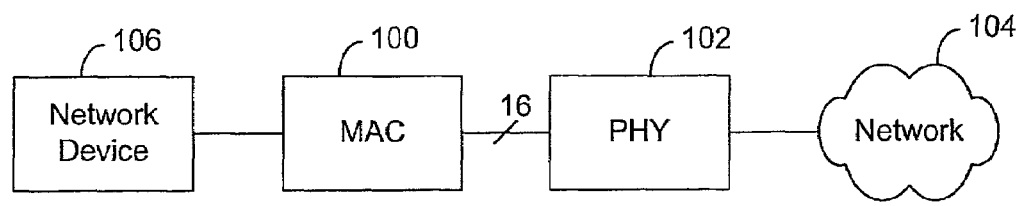
FIG. 1A depicts a block diagram illustrating a standard 10/100Base-T MAC to PHY interface.
Figure 1B:
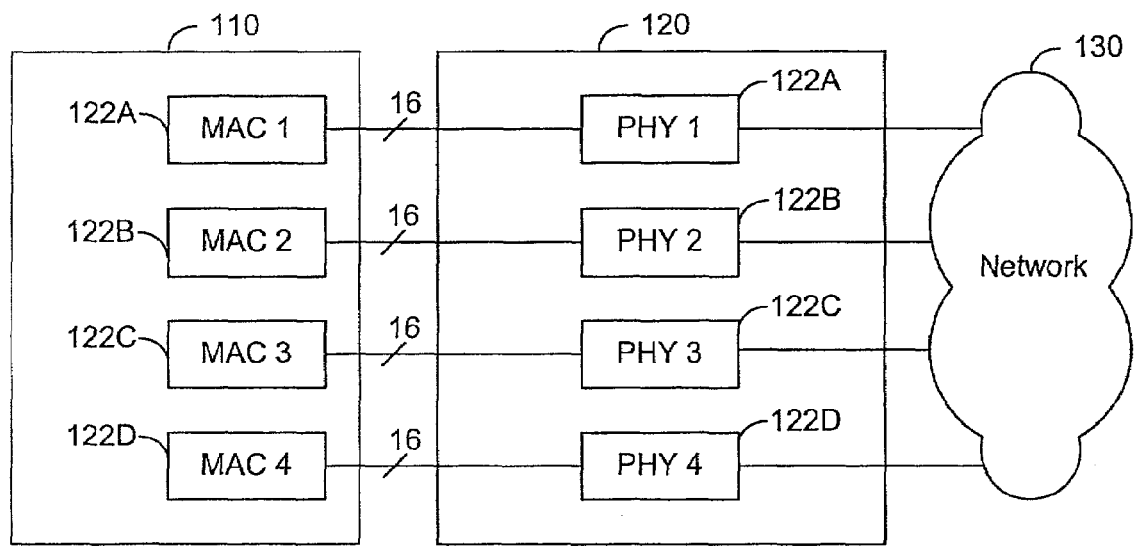
FIG. 1B depicts a block diagram illustrating the problem caused by the number of pins required in the standard MII 10/100Base-T MAC to PHY interface.
Figure 2:
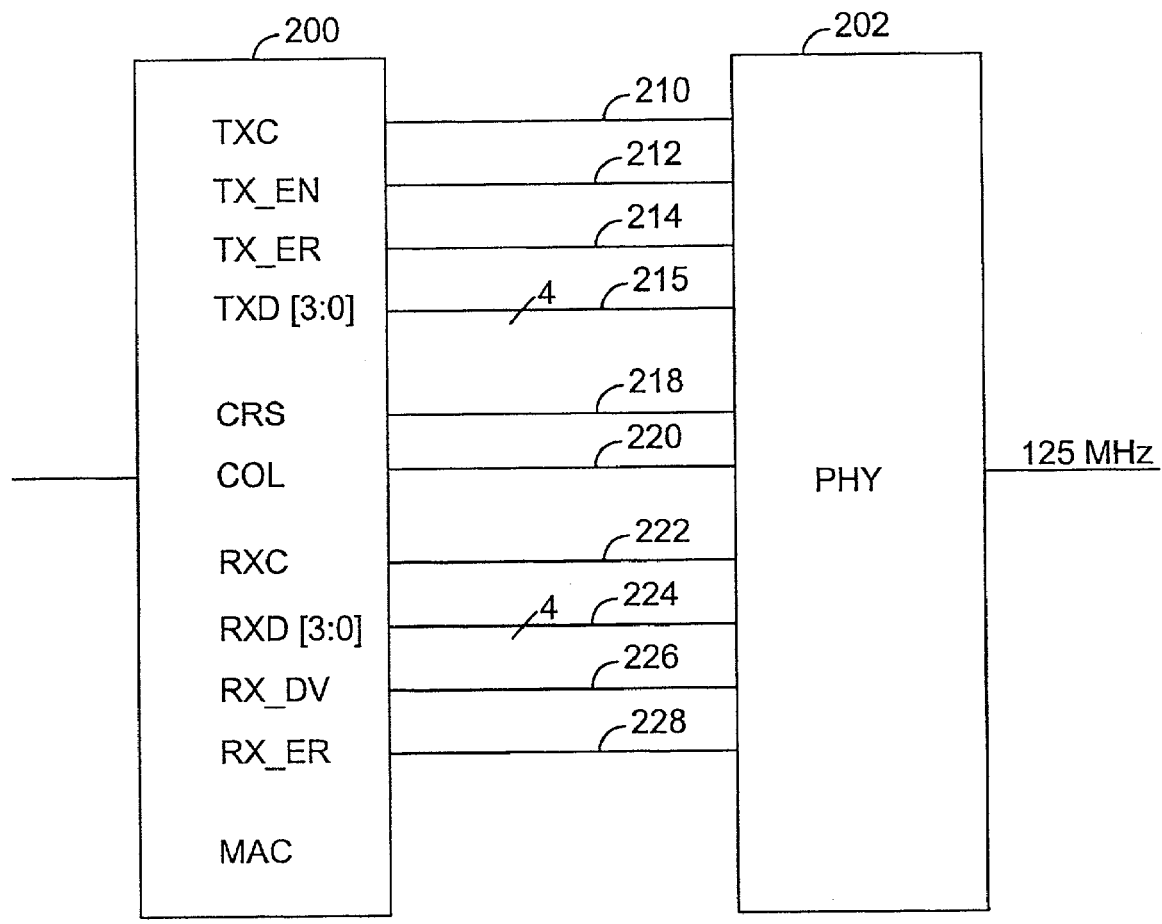
FIG. 2 depicts a block diagram illustrating the functions of the sixteen lines specified in the MII standard.
Figure 3:
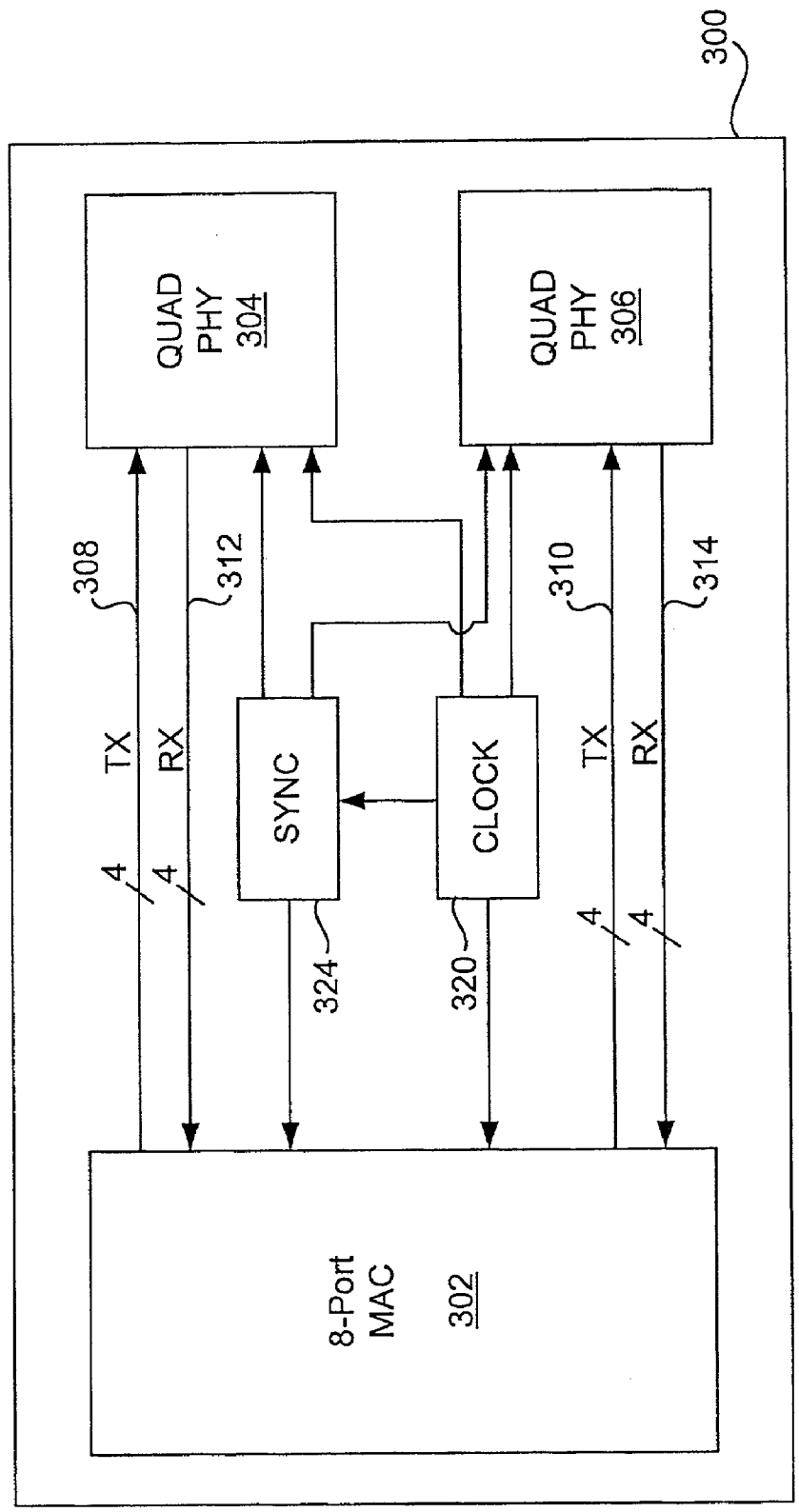
FIG. 3 depicts an implementation of a serial media independent interface (SMII) in accordance with a preferred embodiment of the present invention.

An implementation of a serial media independent interface ("SMII") in accordance with a preferred embodiment of the present invention is illustrated in a block diagram in FIG. 3. The figure shows a multi-port 10/100Base-T Ethernet device 300, for example, a switch, router or hub. The device 300 has eight ports each composed of a MAC and a PHY. In this particular embodiment, the MACs and PHYs composing the ports are located on an 8-port MAC chip 302, and two quad (4-port) PHY chips 304 and 306, respectively.

According to a preferred embodiment of the present invention, the transmit data and transmit control (transmit enable and transmit error) signals are multiplexed on one wire for each port. For example, as shown in FIG. 3, transmit lines 308 and 310 represent four wires each, one for each port on the device 300. Similarly, the receive data and receive control (receive data valid, carrier sense, and receive error) signals are multiplexed on a second wire for each port, for example receive lines 312 and 314 represent four wires each, one for each port on the device 300.

Of the remaining signals, the transmit clock signal is replaced by a global interface clock line (pin/wire) 320 which provides a global synchronized clock signal for from a plurality of ports to all the ports on the multi-port 10/100Base-T Ethernet device. The receive clock signal is handled in such a way that it does not require connection via a wire, as described further below. As noted previously, an additional signal is used in this invention, that being a synchronization pulse signal, which like the global interface clock signal, has its own dedicated global synchronization pulse line (pin/wire) 324 tied to a plurality of ports up to all of the ports on a multi-port 10/100Base-T Ethernet device.

Therefore, the number of pins required for a MAC to transceiver interface using SMII is two times the number of ports plus two, instead of sixteen times the number of ports, as in conventional MII, or six times the number of ports plus one, as in the RMII. Moreover, the SMII provides for in-band data rate (either 10 or 100 MHz) determination, and the addition of each additional port requires only two more wires (pins).

The SMII Receive Path

Figure 4:
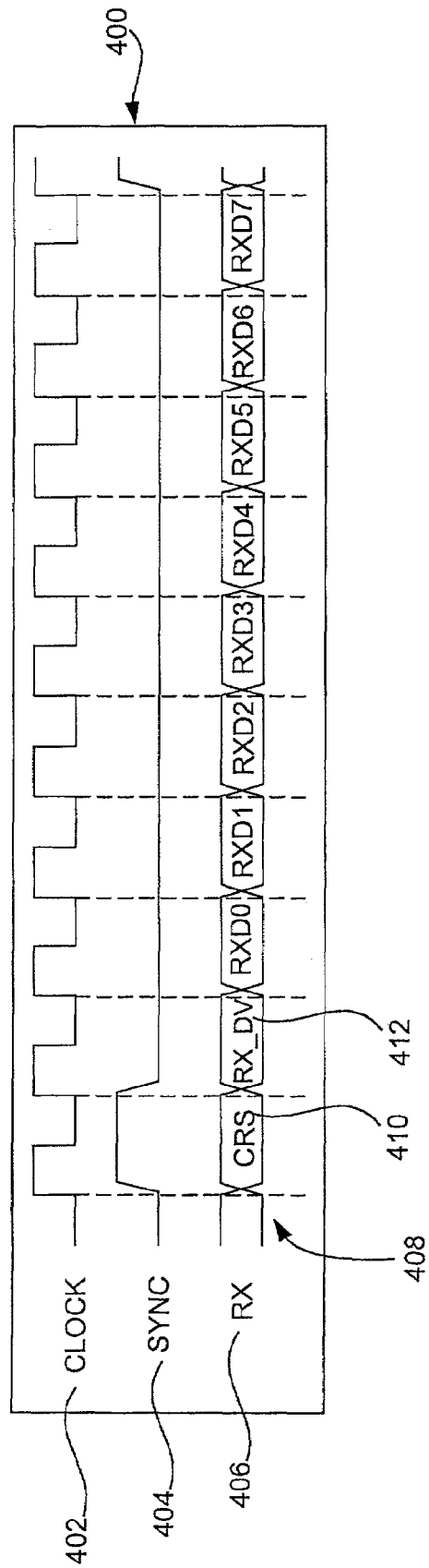
FIG. 4 depicts a sequence diagram illustrating the receive path and the synchronicity between the interface clock, synchronization pulse, and the receive signals, for a 10/100Base-T MAC to PHY SMII in accordance with a preferred embodiment of the present invention.

FIG. 4 depicts a sequence diagram illustrating the receive path and the synchronicity between the interface clock synchronization pulse and the receive signals, for a 10/100Base-T MAC to PHY SMII in accordance with a preferred embodiment of the present invention. Data is preferably conveyed at one bit per 125 clock cycle. A SMII in accordance with a preferred embodiment of the present invention can handle different data rates, for example, 10 and 100 MBit/s. In 100 MBit/s mode, each segment represents a new byte of data. In 10 MBit/sec mode, each segment is repeated ten times so every ten segments represents a new byte of data. The MAC samples one of every ten segments when data is sent in 10 MBit/sec mode. The MAC determines the data rate from inter-frame status bits conveyed on the receive wire, as further described below.

The top-most line 402 in the sequence diagram 400 represents a 125 MHz global clock. As noted above, the global clock signal is conveyed on a global wire to a plurality of ports up to all of the ports on a multi-port 10/100Base-T Ethernet device. The data on the wires of the MAC to PHY interface is sampled and/or driven on the up stroke of each cycle of the clock signal, as indicated by the vertical lines 403 of the sequence diagram 400.

The second line 404 on FIG. 4 represents the synchronization pulse signal, which is asserted one out of every ten cycles of the global clock 402 (every ten clocks), in order to synchronize the MAC to the data stream. The synchronization pulse signal is an additional signal not found among the signals conveyed by a conventional MII. As in the RMII, the purpose of the synchronization pulse in an SMII in accordance with the present invention is to signal the end of each cycle of signals (segment). The synchronization pulse is high during the conveyance of the first of each segment of signals, as described further below. The synchronization pulse signal 404 is also conveyed on a global wire to a plurality of ports up to all of the ports on a multi-port 10/100Base-T Ethernet device.

The third line 406 on FIG. 4 represents the receive signal. Since the global interface clock speed is five times that of the transmit and receive clocks of a conventional MII, five times the information may be conveyed in the same given amount of time. The receive line 406 is divided into "time slots" 408 which each represent one bit of data. The receive data and control signals are time-division multiplexed in 10 125 MHz time slots (making up a 12.5 MHz segment) on a single receive wire per port in accordance with this preferred embodiment of the present invention. In this preferred embodiment, the first two time slots of each segment are dedicated to control signals, carrier sense (CRS) 410 and receive data valid (RX_DV) 412, respectively. The remaining eight slots (RXD0-7) are dedicated to the conveyance of receive data signals.

A conventional MII conveys receive data at 100 MHz by using a 25 MHz clock and four receive data wires. It takes a wire operating at 25 MHz 40 ns to convey 1 bit of data; in MII, four 25 MHz wires convey 4 bits of receive data in 40 ns (1 bit per 10 ns). An SMII in accordance with the present invention allows for the conveyance of data at the same rate as with conventional MII, but with many fewer wires. At 125 MHz it takes only 8 ns to convey 1 bit of data. Therefore, the ten bits conveyed in a segment of receive signals using SMII, including 8 bits (1 byte; equivalent to two MII data nibbles) of receive data, take only 80 ns. Thus, SMII is able to sustain the MII's 1 bit per 10 ns rate of conveying receive data, conveying all the information found on the receive path of a conventional MII, while using only one wire for the purpose.

In a preferred embodiment of the SMII, the two control bits (CRS and RX_DV) in the receive signal segment have the same purpose as the commonly designated signals in MII, except that the signals are all synchronous with the global clock. The SMII receive segment control bits can also be used by the MAC to infer the meaning of the receive data signals on a segment by segment basis by decoding the two control bits. For example, in the inter-frame period, when no receive data is being conveyed on the interface, the RX_DV signal is 0. Since no valid data is being conveyed, the time slots (RXD0-7) normally allotted to receive data when the RX_DV signal is high (1) may be used to convey status information.

In one preferred embodiment, the RXD0 time slot is used to indicate a receive error (RX_ER) from the previous frame of data (where RXD0=1). The RXD1 time slot is used to indicate data rate; RXD1=0 indicates 10 MBit/s, RXD1=1 indicates 100 MBit/s. Thus, the present invention provides in-band data rate communication. The RXD2 time slot is used to indicate the duplex mode; RXD2=0 indicates half duplex (MAC to PHY communication), RXD2=1 indicates full duplex (MAC to MAC communication). The RXD3 time slot is used to indicate the status of the network link (linktestpass); RXD3=0 indicates that the link is down, RXD3=1 indicates that the link is up. The RXD4 time slot is used to indicate the status of the jabber signal (for 10Base-T compatibility); RXD4=0 indicates no jabber error, RXD4=1 indicates a jabber error. The RXD5 time slot is used to indicate the validity of the upper nibble of the last byte of the previous frame; RXD5=0 indicates the nibble is invalid, RXD5=1 indicates the nibble is valid. In this preferred embodiment, the RXD6 and RXD7 time slots are not used to convey status information. Of course, other configurations and different status information may be conveyed using these principles in accordance with the present invention.

As noted above, the SMII of the present invention does not include a receive clock signal. Instead, the receive clock signal is handled, in accordance with a preferred embodiment of the present invention, in a manner that does not require any additional wire between the MAC and PHY chips. With a conventional MII, the PHY passes both data and clock signals to the MAC for each port. Each receive clock operates at an independent frequency. In order to support the individual receive clocks in each conventional MAC chip, there is a dedicated receive clock wire in the MII interface between each MAC and PHY. Also, conventional MAC chips may include an elasticity buffer which is large enough and operates such that it may receive incoming data from the network (via the PHY) and then transfer it to the upper layers using the device system clock in such a manner that it does not empty or reach capacity during the reception of a packet from the network.

In accordance with the present invention, the receive clock wire between each MAC and PHY is eliminated by providing an elasticity buffer (FIFO) in the PHY instead of in the MAC. In this configuration, the PHY is able to receive the data using a clock recovered from the data, and then pass the data to the MAC using the global clock. In order to send receive data to the MAC synchronous to the global clock, the PHY passes the data through an elasticity FIFO to handle any difference between the global clock rate and the clock rate at the packet source (10 MHz). The elasticity FIFO on a PHY in accordance with the present invention should has sufficient capacity, and is preferably operated so that it does not reach capacity nor empty during the reception of a packet. As such, the PHY may receive data using recovered clocks, allowing the buffer to become approximately half full, and then pass data to the MAC using the global clock, which will usually have a different phase and frequency. In this way the buffer never overflows or becomes empty over the course of receiving and transmitting a packet of data, and no receive clock wire is necessary in the SMII.

The Ethernet specification (IEEE 802.3u) calls for packet data to be referenced to a clock with a frequency tolerance of 100 ppm (0.01%). However, it is not uncommon to encounter Ethernet stations with clocks that have frequency errors up to 0.1%. Thus, it is preferable that a FIFO be designed which allows communication with an end station that has a frequency error of up to 0.1% instead of the 0.01% required by the standard. Accordingly, in a preferred embodiment, the size of an elasticity FIFO with sufficient capacity so that the buffer never overflows or becomes empty over the course of receiving and transmitting a packet of data may be calculated as follows:

FIFO size=2*(maximum frame in bits)*(end station error+local error).

In one preferred embodiment, a PHY-based elasticity FIFO that is at least twenty-seven bits long. The size of the FIFO is determined according to the following formula:

$$FIFO\ size = 2*(maximum\ frame\ in\ bits)*(end\ station\ error + local\ error)$$

$$= 2*(1518*8)*(0.1\% + 0.01\%)$$

$$= 26.7\ bits.$$

The elasticity FIFO is preferably allowed to fill to about the half way point before beginning valid data transfer. RXD and RX_DV signals are passed through the elasticity FIFO. RX_ER is asserted if, during the reception of a frame, the FIFO overflows or underflows. The CRS signal is not passed through the elasticity FIFO; instead, the CRS signal is asserted (1) for the time that the PHY is receiving a frame of data.

The SMII Transmit Path

Figure 5:
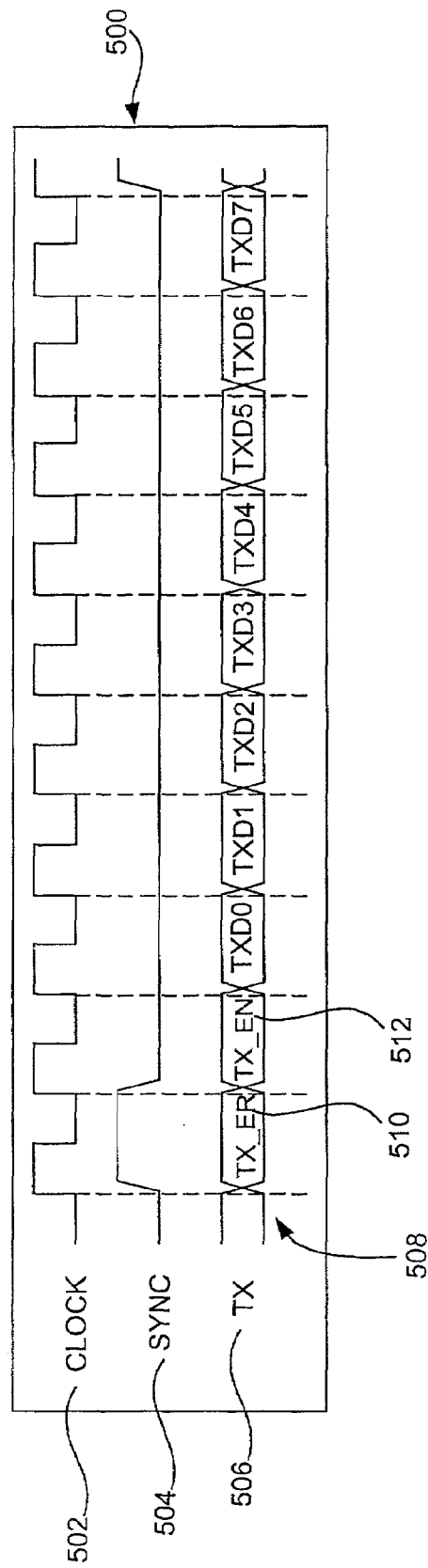
FIG. 5 depicts a sequence diagram illustrating the transmit path and the synchronicity between the interface clock synchronization pulse and the transmit signals, for a 10/100Base-T MAC to PHY SMII in accordance with a preferred embodiment of the present invention.

FIG. 5 depicts a sequence diagram illustrating the transmit path and the synchronicity between the interface clock synchronization pulse and the transmit signals, for a 10/100Base-T MAC to PHY SMII in accordance with a preferred embodiment of the present invention. Data and status are conveyed in substantially the same manner as described above with reference to the receive data path. That is, data is preferably conveyed at one bit per 125 MHz clock cycle. In 100 MBit/s mode, each segment represents a new byte of data. In 10 MBit/sec mode, each segment is repeated ten times so every ten segments represents a new byte of data. The PHY samples one of every ten segments when data is sent in 10 MBit/sec mode. The MAC determines the data rate from inter-frame status bits conveyed on the receive wire, as described above.

The top-most line 502 in the sequence diagram 500 represents a 125 MHz global clock. As noted above, the global clock signal is conveyed on a global wire to a plurality of ports up to all of the ports on a multi-port 10/100Base-T Ethernet device. The data on the wires of the MAC to PHY interface is read and/or driven on the up stroke of each cycle of the clock signal, as indicated by the vertical lines 503 of the sequence diagram 500.

The second line 504 on FIG. 5 represents the synchronization pulse signal, which, as noted above, is high for every ten cycles of the global clock 502 (every ten clocks), in order to synchronize the MAC to the data stream. The MAC generates a synchronization pulse during the conveyance of the first of each segment of signals, as described further below. The synchronization pulse signal 504 is also conveyed on a global wire to a plurality of ports up to all of the ports on a multi-port 10/100Base-T Ethernet device.

The third line 506 on FIG. 5 represents the transmit path. As described above for the receive path, since the global interface clock speed is five times that of the transmit and receive clocks of a conventional MII, five times the information may be conveyed in the same given amount of time. The transmit line 506 is divided into "time slots" 408 which each represent one bit of data. The transmit data and control signals are time-division multiplexed in 10 125 MHz time slots (making up a 12.5 MHz segment) on a single transmit wire per port in accordance with this preferred embodiment of the present invention. In this preferred embodiment, the first two time slots of each segment are dedicated to control signals, transmit error (TX_ER) 510 and transmit enable (TX_EN) 512. The remaining eight slots (TXD0-7) are dedicated to the conveyance of transmit data signals.

A conventional MII conveys transmit data at 100 MHz by using a 25 MHz clock and four transmit data wires. It takes a wire operating at 25 MHz 40 ns to convey 1 bit of data; in MII, four 25 MHz wires convey 4 bits of transmit data in 40 ns (1 bit per 10 ns). As noted above in the description of the receive data path, an SMII in accordance with the present invention allows for the conveyance of data at the same rate as with conventional MII, but with fewer wires. At 125 MHz it takes only 8 ns to convey 1 bit of data. Therefore, the ten bits conveyed in a segment of transmit signals using SMII, including 8 bits (1 byte; equivalent to two MII data nibbles) of transmit data, take only 80 ns. Thus, SMII is able to sustain the MII's 1 bit per 10 ns rate of conveying transmit data, conveying all the information found on the transmit path of a conventional MII, while using only one wire for the purpose.

It is generally not necessary to pass status information from the MAC to the PHY because the PHY is able to detect the status. Therefore, in one embodiment, no status information is passed using the transmit data line in a manner that status information is passed using the receive data line. However, in other embodiments, this may be done if desired.

Collisions are detected when the transmit enable signal and the carrier sense signal are both asserted. For this method of detecting collisions to work, the PHY must ensure that CRS is not affected by its transmit path. When both the transmit enable and carrier sense are asserted, then a collision has occurred.

Figure 6:
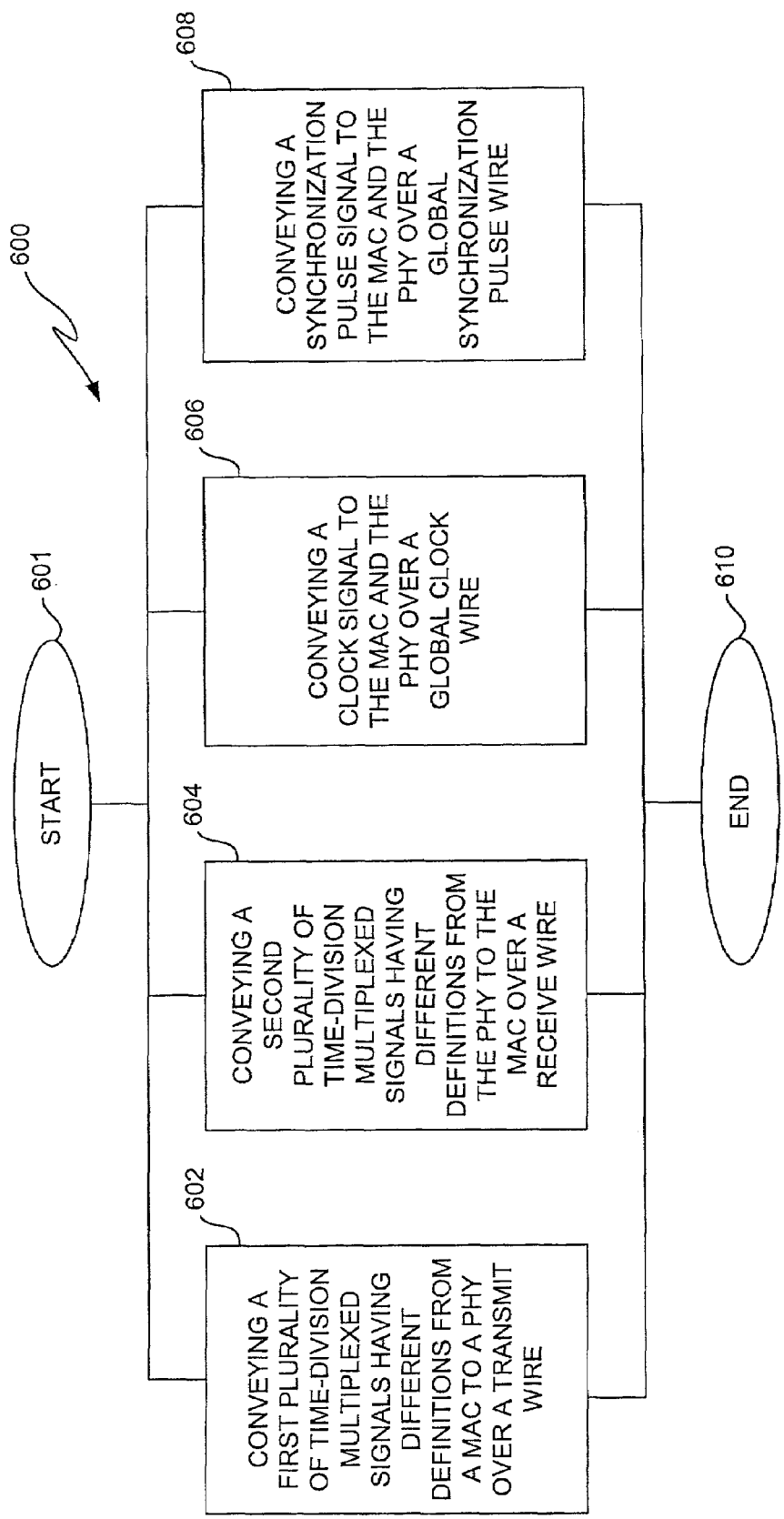
FIG. 6 depicts a flow diagram of a method of interfacing a 10/100Base-T MAC to PHY in accordance with a preferred embodiment of the present invention.

FIG. 6 depicts a flow diagram of a method of interfacing a 10/100Base-T MAC to a PHY in accordance with a preferred embodiment of the present invention. It should be understood that this process flow is intended to illustrate the way in which signals are conveyed between MACs and PHYs in accordance with a preferred embodiment of the present invention, and not to indicate a sequence of events. The various steps of the process 600 may be occurring concurrently. The process 600 begins at 601, and at a step 602 time-division multiplexed transmit signals of different definitions are conveyed from a MAC to a PHY over a transmit wire. At a step 604, time-division multiplexed receive signals of different definitions are conveyed from the PHY to the MAC over a receive wire.

In addition, the MAC to PHY interface process 600 involves conveying clock and synchronization signals on each of two global wires, as described previously with reference to FIG. 3. At a step 606 of process 600, a 125 MHz clock signal is conveyed to the MAC and the PHY over a global clock wire. At a step 608, a synchronization pulse signal is conveyed to the MAC and the PHY over a global synchronization pulse wire. Thus, the 10/100Base-T MAC to PHY interfacing may be accomplished in accordance with the present invention using only 2 times (the number of ports)+2 wires. The interfacing process ends at 610.

Figure 7:
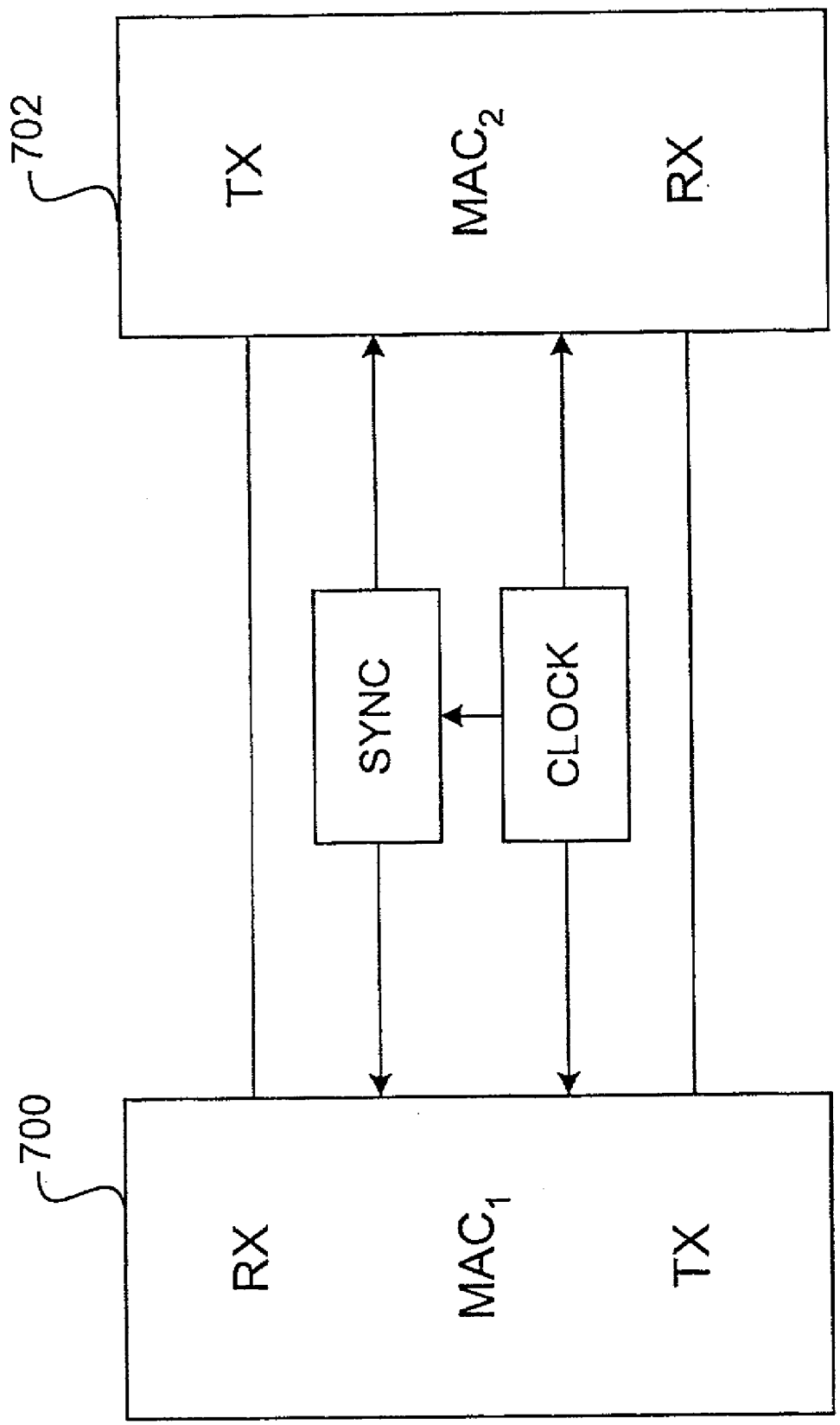
FIG. 7 depicts a block diagram illustrating how an SMII in accordance with the present invention may be used for full duplex MAC to MAC communication.

In addition to being used as a MAC to PHY interface, an SMII in accordance with the present invention may also be used as a direct connection between two MACs. FIG. 7 is a block diagram illustrating how the two wires of an SMII in accordance with the present invention may be connected between a first MAC 700 and a second MAC 702. The receive line and the transmit line of MAC 700 are connected to the transmit line and the receive line of MAC 702, respectively. The receive and transmit segments have nearly a bit to bit correspondence. The transmit enable signal sent from one MAC can be interpreted as a receive data valid signal by the other MAC. The transmit segment does not include a bit that signals carrier sense but for a MAC to MAC interface, the carrier sense time slot can be defined to be deasserted. This is not a problem as long as both MACs are operating in full duplex mode.

Status information is included in the transmit path between frames when transmit enable is 0. The first transmit data bit of the transmit line (TXD0) is used to force an error in a direct MAC to MAC connection, with 1 indicating an error. The second bit of the transmit data line (TXD1) is used to indicate speed, with 0 indicating 10 MBits/s, and 1 indicating 100 MBits/s. The third bit (TXD2) indicates duplex mode with 1 indicating full duplex. The fourth bit (TXD3) indicates link status with 1 indicating that the link is up, and the fifth bit (TXD4) indicates jabber with a 0 indicating no jabber. In other embodiments, these conventions may be changed. When transmit enable is 1, then the transmit data on the transmit line is interpreted as being an SMII data byte.

Thus, the present invention provides a two wire 10/100Base-T SMII using time-division multiplexed receive and transmit signals which can be used to convey all of the data and control information transferred by the standard IEEE MII interface. A common clock signal is used for both the MAC and the PHY and the time-division multiplexed segments are synchronized using a synchronization pulse on the receive and the transmit lines. Thus, the number of wires required for a 10/100Base-T MAC to PHY interface can be reduced, enabling more MACs or PHYs to be implemented on a single chip.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A multi-port Ethernet device, comprising:
a MAC chip having one or more ports;
a PHY chip having one or more ports, said PHY chip comprising an elasticity FIFO, wherein the capacity of said elasticity FIFO is calculated as follows:

FIFO size=2*(maximum frame in bits)*(end station error+local error); and a 10/100Base-T interface connecting said MAC and PHY chips, said interface comprising,
two time-division multiplexed wires per port on each chip, each time-division multiplexed wire conveying a plurality of time-division multiplexed signals having different definitions wherein said two time-division multiplexed wires comprise a transmit wire and a receive wire, and
two global wires conveying clock and synchronization pulse signals for up to all of the ports on each chip.

2. The Ethernet device of claim 1, wherein said transmit wire conveys 8 bits of transmit data per segment.

3. The Ethernet device of claim 1, wherein said receive wire conveys receive data valid, carrier sense, and receive data signals in a segment from said PHY chip to said MAC chip.

4. The Ethernet device of claim 3 wherein said transmit wire conveys a transmit enable, transmit data, and transmit error signals in a segment from said MAC chip to said PHY chip.

5. The Ethernet device of claim 3, wherein said receive wire conveys 8 bits of receive data per segment.

6. The Ethernet device of claim 1, wherein said clock signal has a frequency of about 125 MHz.

7. The Ethernet device of claim 1, wherein said time-division multiplexed signals are conveyed on said time-division multiplexed wires in about 12.5 MHz time slots.

8. The Ethernet device of claim 1, wherein said synchronization pulse is asserted one out of every ten clocks.

9. A method of interfacing a MAC chip to a PHY chip in an Ethernet device, comprising:
conveying a first plurality of time-division multiplexed signals having different definitions from a MAC chip to a PHY chip over a 10/100Base-T transmit wire, the PHY chip comprising an elasticity FIFO, wherein the capacity of said elasticity FIFO is calculated as follows:

FIFO size=2*(maximum frame in bits)*(end station error+local error);

conveying a second plurality of time-division multiplexed signals having different definitions from the PHY chip to the MAC chip over a 10/100Base-T receive wire;
conveying a clock signal to said MAC chip and said PHY chip over a global clock wire; and
conveying a synchronization pulse signal to said MAC chip and said PHY chip over a global synchronization pulse wire.

10. The method of claim 9, wherein said receive wire conveys receive data valid, carrier sense, and receive data signals in a segment from said PHY chip to said MAC chip.

11. The method of claim 10, wherein said transmit wire conveys a transmit enable, transmit data, and transmit error signals in a segment from said MAC chip to said PHY chip.

12. The method of claim 11, wherein said transmit wire conveys 8 bits of transmit data per segment.

13. The method of claim 10, wherein said receive wire conveys 8 bits of receive data per segment.

14. The method of claim 9, wherein said clock signal has a frequency of about 125 MHz.

15. The method of claim 9, wherein said time-division multiplexed signals are conveyed on said time-division multiplexed wires in about 125 MHz time slots.

16. The method of claim 9, wherein said synchronization pulse is asserted one out of every ten clocks.

17. A multi-port Ethernet media access control layer chip, comprising:
- a 10/100Base-T interface for connecting said media access control layer chip with a physical layer chip, said interface comprising,
- two time-division multiplexed pins per port on said media access control layer chip, each time-division multiplexed wire conveying a plurality of time-division multiplexed signals having different definitions, wherein said two time-division multiplexed pins comprise a transmit pin and a receive pin, and wherein said transmit pin conveys transmit enable, transmit data, and transmit error signals in a segment from said media access control layer chip to a physical layer chip, and
- two global pins conveying clock and synchronization pulse signals for up to all of the ports on said media access control layer chip.

18. The media access control layer chip of claim 17, wherein said transmit pin conveys 8 bits of transmit data per segment.

19. The media access control layer chip of claim 17, wherein said receive pin conveys receive data valid, carrier sense, and receive data signals in a segment from a physical layer chip to said media access control layer chip.

20. The media access control layer chip of claim 19, wherein said receive pin conveys 8 bits of receive data per segment.

21. The media access control layer chip of claim 17, wherein said clock signal has a frequency of about 125 MHz.

22. The media access control layer chip of claim 17, wherein said time-division multiplexed signals are conveyed on said time-division multiplexed pins in about 12.5 MHz time slots.

23. The media access control layer chip of claim 17, wherein said synchronization pulse is asserted one out of every ten clocks.

24. A multi-port Ethernet physical layer chip, comprising:
- a 10/100Base-T interface for connecting said physical layer chip with a media access control layer chip, said interface comprising,
- two time-division multiplexed pins per port on said physical layer chip, each time-division multiplexed pin conveying a plurality of time-division multiplexed signals having different definitions, wherein said two time-division multiplexed pins comprise a transmit pin and a receive pin, and wherein said transmit pin conveys transmit enable, transmit data, and transmit error signals in a segment from a media access control layer chip to said physical layer chip, and
- two global pins conveying clock and synchronization pulse signals for up to all of the ports on said physical layer chip.

25. The physical layer chip of claim 24, wherein said transmit pin conveys 8 bits of transmit data per segment.

26. The physical layer chip of claim 24, wherein said receive pin conveys receive data valid, carrier sense, and receive data signals in a segment from said physical layer chip to a media access control layer chip.

27. The physical layer chip of claim 26, wherein said receive pin conveys 8 bits of receive data per segment.

28. The physical layer chip of claim 24, wherein said clock signal has a frequency of about 125 MHz.

29. The physical layer chip of claim 24, wherein said time-division multiplexed signals are conveyed on said time-division multiplexed pins in about 12.5 MHz time slots.

30. The physical layer chip of claim 24, wherein said synchronization pulse is asserted one out of every ten clocks.

31. The physical layer chip of claim 24, wherein said physical layer chip further comprises an elasticity FIFO.

32. The physical layer chip of claim 31, wherein the capacity of said elasticity FIFO is calculated as follows:

$$\text{FIFO size} = 2*(\text{maximum frame in bits})*(\text{end station error} + \text{local error}).$$

33. A multi-port Ethernet physical layer chip, comprising:
- a 10/100Base-T interface for connecting said physical layer chip with a media access control layer chip, said interface comprising,
- two time-division multiplexed pins per port on said physical layer chip, each time-division multiplexed pin conveying a plurality of time-division multiplexed signals having different definitions, and
- two global pins conveying clock and synchronization pulse signals for up to all of the ports on said physical layer chip; and
- an elasticity FIFO, wherein the capacity of said elasticity FIFO is calculated as follows:

$$\text{FIFO size} = 2*(\text{maximum frame in bits})*(\text{end station error} + \text{local error}).$$

34. The physical layer chip of claim 33, wherein said two time-division multiplexed pins comprise a transmit pin and a receive pin.

35. The physical layer chip of claim 34, wherein said transmit pin conveys transmit enable, transmit data, and transmit error signals in a segment from a media access control layer chip to said physical layer chip.

36. The physical layer chip of claim 35, wherein said transmit pin conveys 8 bits of transmit data per segment.

37. The physical layer chip of claim 34, wherein said receive pin conveys receive data valid, carrier sense, and receive data signals in a segment from said physical layer chip to a media access control layer chip.

38. The physical layer chip of claim 37, wherein said receive pin conveys 8 bits of receive data per segment.

39. The physical layer chip of claim 33, wherein said clock signal has a frequency of about 125 MHz.

40. The physical layer chip of claim 33, wherein said time-division multiplexed signals are conveyed on said time-division multiplexed pins in about 12.5 MHz time slots.

41. The physical layer chip of claim 33, wherein said synchronization pulse is asserted one out of every ten clocks.

* * * * *